(12) United States Patent
Wang et al.

(10) Patent No.: US 6,925,485 B1
(45) Date of Patent: Aug. 2, 2005

(54) PROXY CACHE PRELOADER

(75) Inventors: Feng Wang, Palo Alto, CA (US); Jay Brandenburg, Atherton, CA (US); Ronan French, Dublin (IE); David C. Tracey, Monasterbolco (IE)

(73) Assignee: Sun Microsystems, Inc., Santa Clara, CA (US)

( * ) Notice: Subject to any disclaimer, the term of this patent is extended or adjusted under 35 U.S.C. 154(b) by 404 days.

(21) Appl. No.: 10/155,694

(22) Filed: May 24, 2002

(Under 37 CFR 1.47)

(51) Int. Cl.$^7$ .............................................. G06F 13/17
(52) U.S. Cl. ..................... 709/202; 711/156
(58) Field of Search ............... 709/202, 213, 709/217, 219; 711/156

(56) References Cited

U.S. PATENT DOCUMENTS

2002/0038301 A1 * 3/2002 Aridor et al. ................. 707/10

OTHER PUBLICATIONS

Fielding, et al., HTTP/1.1 summary page for RFC 2616, Jun. 1999, from http://www.w3.org/Protocols/rfc2616/rfc2616.html, 6 pages as printed.*
Fielding, et al., HTTP/1.1 Section 9 of RFC 2616, Method Definitions, Jun. 1999, from http://www.w3.org/Protocol/rfc2616/rfc2616-sec9.html, 5 pages as printed.*
Fielding, et al., HTTP/1.1 Section 13 of RFC 2616, Caching in HTTP, Jun. 1999, from http://www.w3.org/Protocols/rfc2616/rfc2616-sec13.html, 20 pages as printed.*
Fielding, et al., HTTP/1.1 Section 14 of RFC 2616, Header Field Definitions, Jun. 1999, from http://www.w3.org/Protocols/rfc2616/rfc2616-sec-14.html, 39 pages as printed.*

* cited by examiner

Primary Examiner—David L. Robertson
(74) Attorney, Agent, or Firm—Martine Penilla & Gencarella, LLP

(57) ABSTRACT

The present invention is directed to a proxy cache preloader. According to an embodiment of the present invention, a Hyper Text Transfer Protocol (HTTP) client intermediary having a proxy cache is used to provide multiple client computing devices with access to Internet data in the cache. When a device needs access to Internet data (i.e., a web page), a preloader/refresh mechanism is employed which uses a preloader algorithm. In one embodiment, the preloader algorithm checks to see if the current request is for an HTTP Uniform Resource Locator (URL). If not, the data is re-loaded into the proxy cache. If the current request is a request for HTTP, the preloader mechanism determines if optimization is enabled for the URL. If not, the data is re-loaded into the proxy cache. Otherwise, an information retrieval method (e.g., an HTTP GET) optimization algorithm is employed.

26 Claims, 7 Drawing Sheets (Prior Art)

PROXY CACHE PRELOADER

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to network computing. More specifically, embodiments of the invention are directed to a proxy cache preloader.

2. Background Art

The Internet has made it possible for computer users to access their applications, files, and data from any web-enabled device. One type of Internet configuration where this is possible uses a local cache within a web-enabled device. The local cache is connected to the Internet.

Using a cache generally reduces access latencies and bandwidth consumption on the Internet because if the web-enabled device requests a web page from the Internet and the cache determines that the version of the web page in the cache is current, then that web page is presented to the device. This saves a potentially costly web page request across the Internet.

Updating the Proxy Cache

To ensure that a cache is utilized sufficiently, it needs to be updated periodically. For instance, if the web page in the above example is dynamically generated by Hyper Text Markup Language (HTML), in the event of infrequent updates it might become outdated every time a device requests it. In this case, the Internet must be accessed every time and the use of the cache as an intermediary is less advantageous. To this end, an intermediary might periodically refresh the contents of the cache. Refreshing its contents, however, entails bandwidth consumption on the part of the intermediary, as well, so refreshing the cache too frequently is detrimental. Thus, using prior art caches, it is difficult to satisfy both needs for having fresh data and limiting bandwidth consumption.

Eviction Policy

Due to the limited size of its memory, cache entries are typically evicted for various reasons to free-up room for other entries. For instance, when an entry is not accessed for a long time, it might be evicted. Take, for example, one situation where a user accesses a point of sale (POS) terminal and requests an applet where the applet resides on the other side of a slow wide area network (WAN) connection. The time it takes to cache the applet is prohibitively slow, but the time it takes to access the applet from the cache is very fast. If the applet is evicted too quickly, the slow WAN connection must be used again when the next request for it takes place. This is problematic.

SUMMARY OF THE INVENTION

The present invention is directed to a proxy cache preloader. According to the present invention, an intermediary Hyper Text Transfer Protocol (HTTP) client having a local or external proxy cache is used to provide multiple web-enabled computing devices with access to Internet data (i.e., Uniform Resource Locators or URLs). When a device needs access to Internet data, such as a web page, a preloader/refresh mechanism is employed which uses a preloader algorithm.

In one embodiment, the preloader/refresh mechanism employs a preloader algorithm which checks to see if the current request is for an HTTP URL. If not, the data is re-loaded into the proxy cache. If it is a request for HTTP, the preloader mechanism determines if optimization is enabled for the URL. If not, the data is re-loaded into the proxy cache. Otherwise, an HTTP information retrieval method (e.g., an HTTP GET) optimization algorithm is employed.

In one embodiment, the information retrieval method (e.g., HTTP GET) optimization algorithm responds to a request for an object by sending a request to a server for the desired URL and examining the server's response by parsing the response header's time and date indication field (e.g., Last-Modified field). If there is no time and date indication (e.g., Last-Modified) field in the response header or if the contents of the time and date indication (e.g., Last Modified) field are invalid, the document is retrieved. Otherwise, a conditional field (e.g., an If-Modified-Since field) is set to the same value as the previous response header's time and date indication (e.g., Last-Modified) field, a request is made with the pragma field set to no-cache and the conditional (e.g., If-Modified-Since) field set to the same value as the previous response header's time and date indication (e.g., Last Modified) field. If the HTTP server sends a not modified response, no action is taken. Otherwise the server will respond by sending the entire object.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 7:
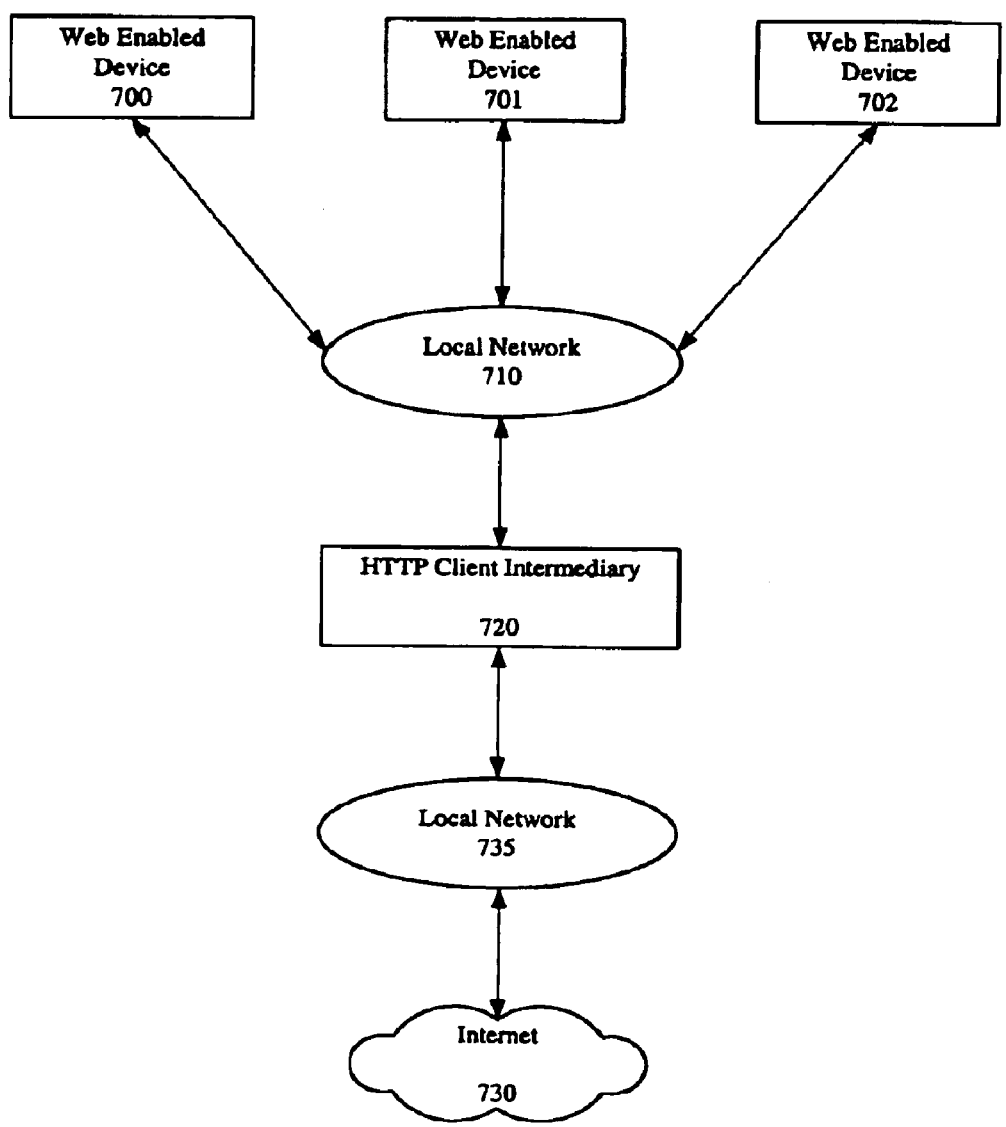
FIG. 7 shows an example of an Internet configuration that uses an HTTP client as an intermediary.

The Internet has made it possible for computer users to access their applications, files, and data from any web-enabled device. One such Internet configuration uses an Hyper Text Transfer Protocol (HTTP) client as an intermediary. FIG. 7 shows an example of this configuration. Web-enabled devices 700, 701, and 702 are connected via a local network 710 to an intermediary 720. Web-enabled devices 700, 701, and 702 may comprise a general purpose computer, a personal digital assistant (PDA), a web-enabled cellular phone, or a myriad of other devices. Intermediary 720 is connected to the Internet 730 via an external network 735. The intermediary 720 acts as a proxy cache for local access by web-enabled devices 700, 701, and 702 to applications and data.

Using an HTTP client as an intermediary generally reduces access latencies and bandwidth consumption, especially when multiple browser clients share a proxy cache on the same system. For example, if device 700 requests a web page from Internet 730 and intermediary 720 determines that the version of the web page in the proxy cache is current, then that web page is presented to device 700. This economizes what otherwise may be a costly web page request across external network 735. Similarly, if device 701 requests the same web page soon after, it is presented from the intermediary 720 to the device 701 without needing external Internet access.

The present invention relates to a proxy cache preloader. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Proxy Cache Preloader

According to one embodiment, a preload/refresh mechanism is integrated into the proxy cache itself which gives it access to freshness information (i.e., information on whether a resource in the proxy cache is up-to-date). In another embodiment, an HTTP processor (e.g., on an HTTP client computer), separate from the proxy cache, is equipped with the preload/refresh mechanism and obtains the freshness information by issuing an HTTP request. The freshness information is obtained, for instance, by examining a time and date indication field (e.g., a Last-Modified field) available from certain HTTP Uniform Resource Locators (URLs). These embodiments of the invention are shown in FIGS. 1 and 2.

Figure 1:
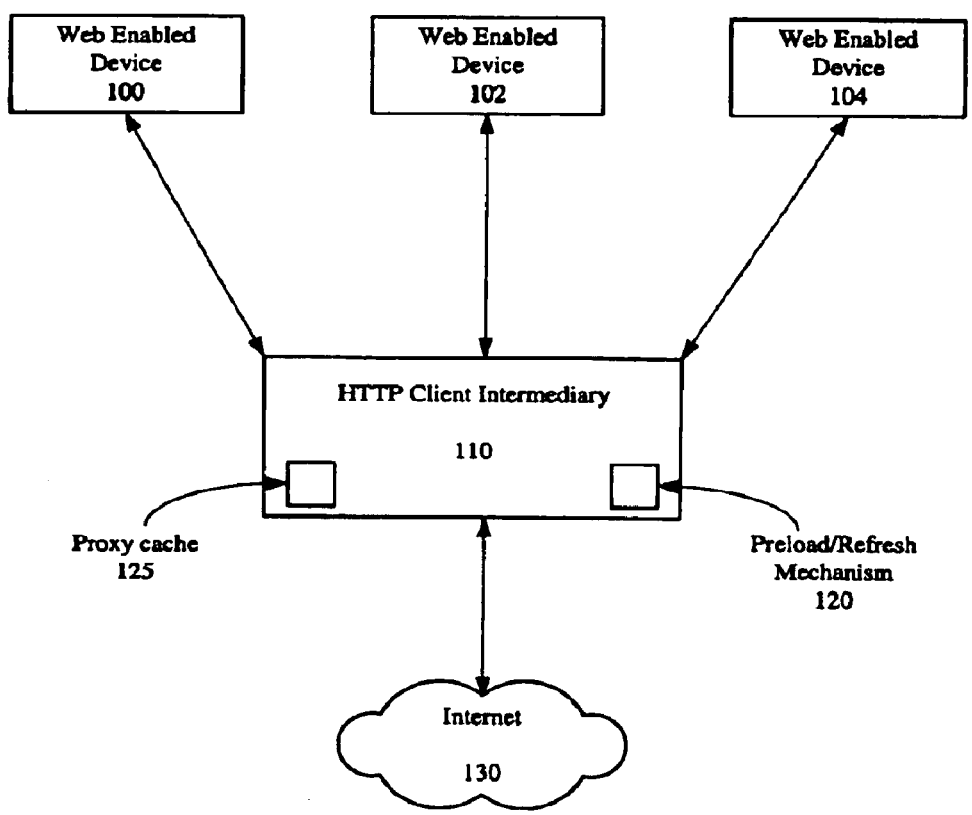
FIG. 1 is a proxy cache preloader architecture according to an embodiment of the present invention.
Figure 2:
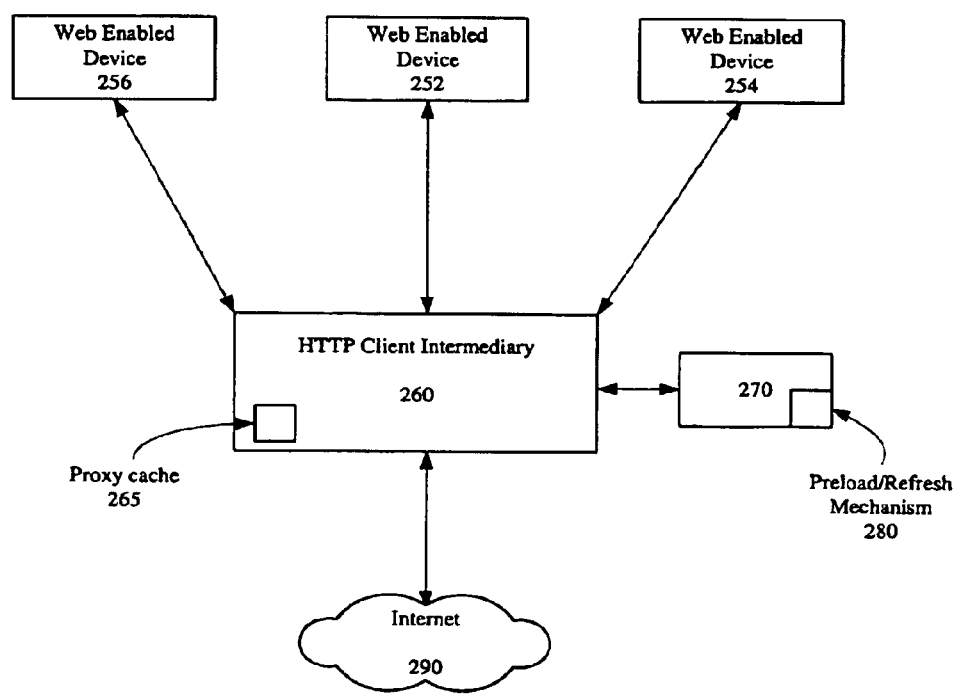
FIG. 2 is a proxy cache preloader architecture according to another embodiment of the present invention.

FIG. 1 is a proxy cache preloader architecture according to an embodiment of the present invention. Web enabled devices 100, 102, and 104 are connected to intermediary HTTP client 110. Intermediary 110 includes a preload/refresh mechanism 120 and a proxy cache 125. Intermediary 10 is connected to an interconnected system (e.g., the Internet) 130. FIG. 2 is a proxy cache preloader architecture according to another embodiment of the present invention. Web enabled devices 256, 252, and 254 are connected to intermediary 260. Intermediary 260 has a proxy cache 265 and is connected to a separate HTTP processor 270 (e.g., a client computer) that has a preload/refresh mechanism 280. Intermediary 260 is connected to the Internet 290 and the HTTP processor 270 (and, thus, the preload/refresh mechanism 280) is not directly connected to the Internet 290. In operation, freshness information is obtained by HTTP processor 270 by issuing an HTTP request to the Internet 290 via intermediary 260.

Preloader Algorithm

The preload/refresh mechanism employs a preloader algorithm. The preloader algorithm takes into account most URLs that can be usefully cached, including those retrieved by an HTTP, a File Transfer Protocol (FTP), and a GOPHER protocol. For HTTP, the preloader optimizes the preloading by use of a time and date indication field (e.g., Last-Modified filed) and a conditional field (e.g., If-Modified-Since field), features that are available as components of the HTTP protocol for communication between clients and servers. The If-Modified-Since conditional field feature is a request-header field that is used with an informational retrieval method (e.g., a GET method) to make it conditional. The GET method means retrieve whatever information (in the form of an entity) is identified by the request. If the requested resource has not been modified since the time specified in this field, a copy of the resource I will not be returned from the server; instead, an HTTP response code of "not modified" (meaning that the resource is not to be modified) will be returned without any "Entity-Body" (the body content) of the resource (object or document). An example of this field is:

If-Modified-Since: Sat, 29 Oct. 1994 19:43:31 GMT

The Last-Modified entity-header field indicates the date and time at which the sender believes the resource was last modified. The exact semantics of this field are defined in terms of how the recipient should interpret it. If the recipient has a copy of this resource which is older than the date given by the Last-Modified field, that copy should be considered stale. An example of its use is:

Last Modified: Tue, 15 Nov. 1994 12:45:26 GMT

The exact meaning of this header field depends on the implementation of the sender and the nature of the original resource. For files, it may be just the file system last-modified time. For entities with dynamically included parts, it may be the most recent of the set of last-modify times for its component parts. For database gateways, it may be the last-update timestamp of the record. For virtual objects, it may be the last time the internal state changed. Modification time features are not supported by FTP or GOPHER. Even for an HTTP URL, it is possible that the web server for the URL does not support modification time features, so there are different algorithms for the three cases:

1. If the protocol for the desired URL is not HTTP, an HTTP GET request is sent to the ftp:// or gopher:// URL with a pragma field set to "no-cache." This request guarantees that the preloader retrieves the most updated copy from the FTP or GOPHER server in one pass and loads it in the cache. The pragma directive specifies optional behavior. When the no-cache directive is present in a request message, an application forwards the request toward the origin even if it has a cached copy of what is being requested.

2. If the protocol for the desired URL is HTTP, the preloader maintains for each URL a flag that is set if optimization is enabled for it. The flag for a URL is inherited from its parent URL, while the optimization is enabled for root URL initially. If optimization is not enabled for a URL, the preloader sends an HTTP GET request with the pragma field set to no-cache. This request guarantees the preloader retrieves the most updated copy from the HTTP server in one pass and that it is loaded into its cache.

3. If optimization is enabled for a URL, the preloader uses an "HTTP GET optimization algorithm," described later in this document.

Figure 3:
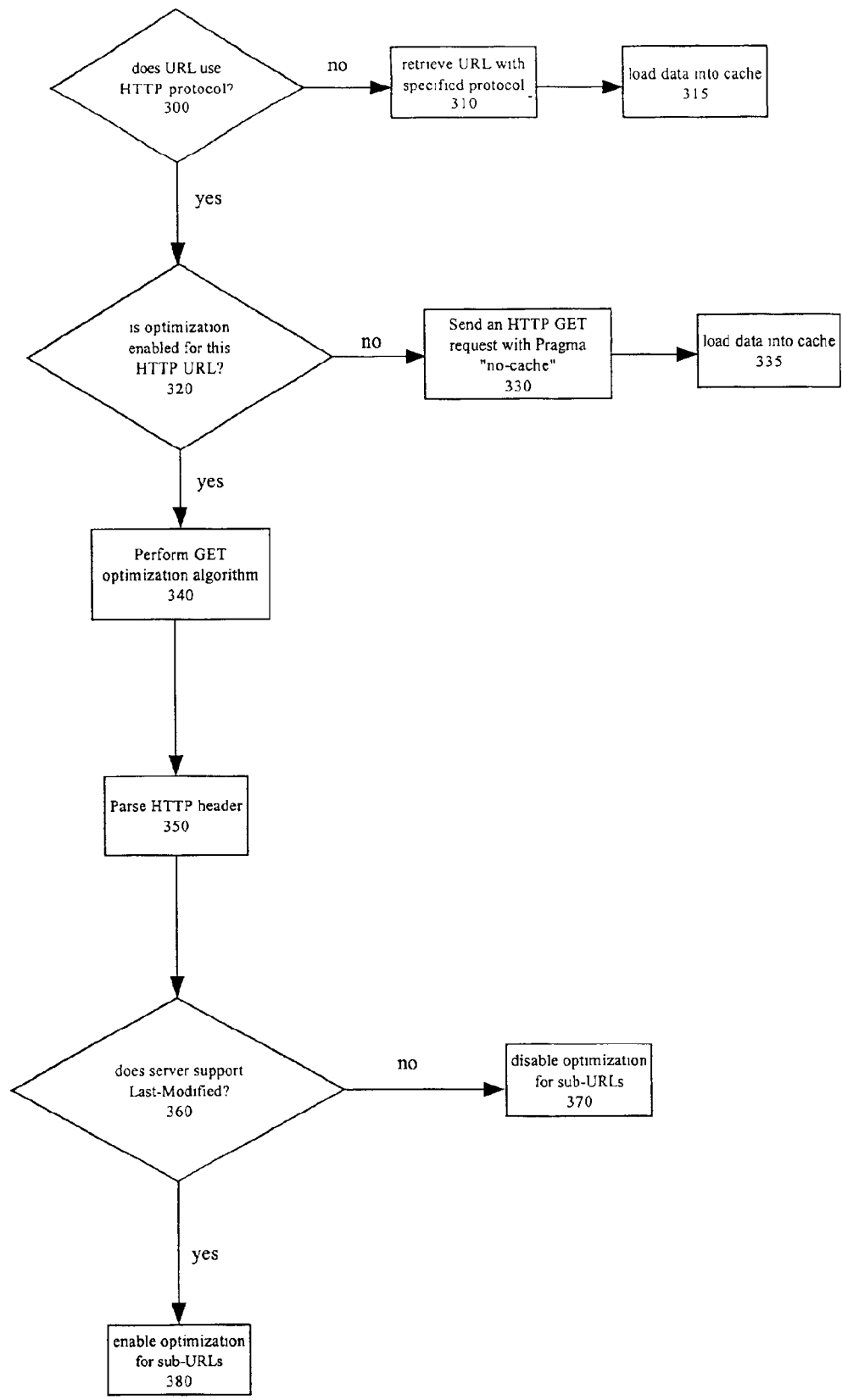
FIG. 3 is a flowchart showing a top level preloader algorithm according to an embodiment of the present invention.

An embodiment of the top level preloader algorithm is shown in FIG. 3. At box 300, it is determined if the URL uses the HTTP protocol. If it does not, it uses some other protocol that cannot be optimized, such as FTP or GOPHER. In this case, a GET request is sent to the specified non-HTTP URL at box 310 and the data is loaded into the cache at step 315. If the URL uses the HTTP protocol, then at box 320, it is determined if optimization is enabled for this URL. If not, a GET request is sent to the specified HTTP URL at box 330 and the data is loaded into the cache at box 335. If optimization is enabled, then at box 340, an HTTP GET optimization algorithm is performed. At box 350, the HTTP header is parsed. At box 360, it is determined if the server supports Last-Modified. If not, the optimization is disabled for any sub-URLs at box 370. If so, the optimization is enabled for the sub-URLs at box 380.

HTTP GET Optimization Algorithm

The following HTTP GET optimization algorithm attempts to reduce network traffic in the typical case. One embodiment of the algorithm is as follows:

1. Send a GET request for the desired URL. This request will be satisfied from the cache if the object is in cache, otherwise it will be retrieved from the HTTP server (or parent proxy cache) and loaded in the local cache. (If the proxy cache's freshness algorithm were sufficient to ensure freshness, this algorithm would need only this step. To ensure freshness of an object that may or may not be the latest version, this algorithm needs to explicitly check modification time as in the following steps.)

2. Send a GET request to the server and parse the server's response header for Last-Modified field. If there is no Last-Modified field in the response header, or if the contents of the Last-Modified field are invalid, the algorithm terminates.

3. Send a GET request with the pragma field set to no-cache. Have the If-Modified-Since field set to the same value as the previous response header's Last-Modified field. The HTTP server will send a HTTP response code of "not modified" code response (for not modifying the object) if the object is up to date, otherwise it will respond by sending the entire object.

Figure 4:
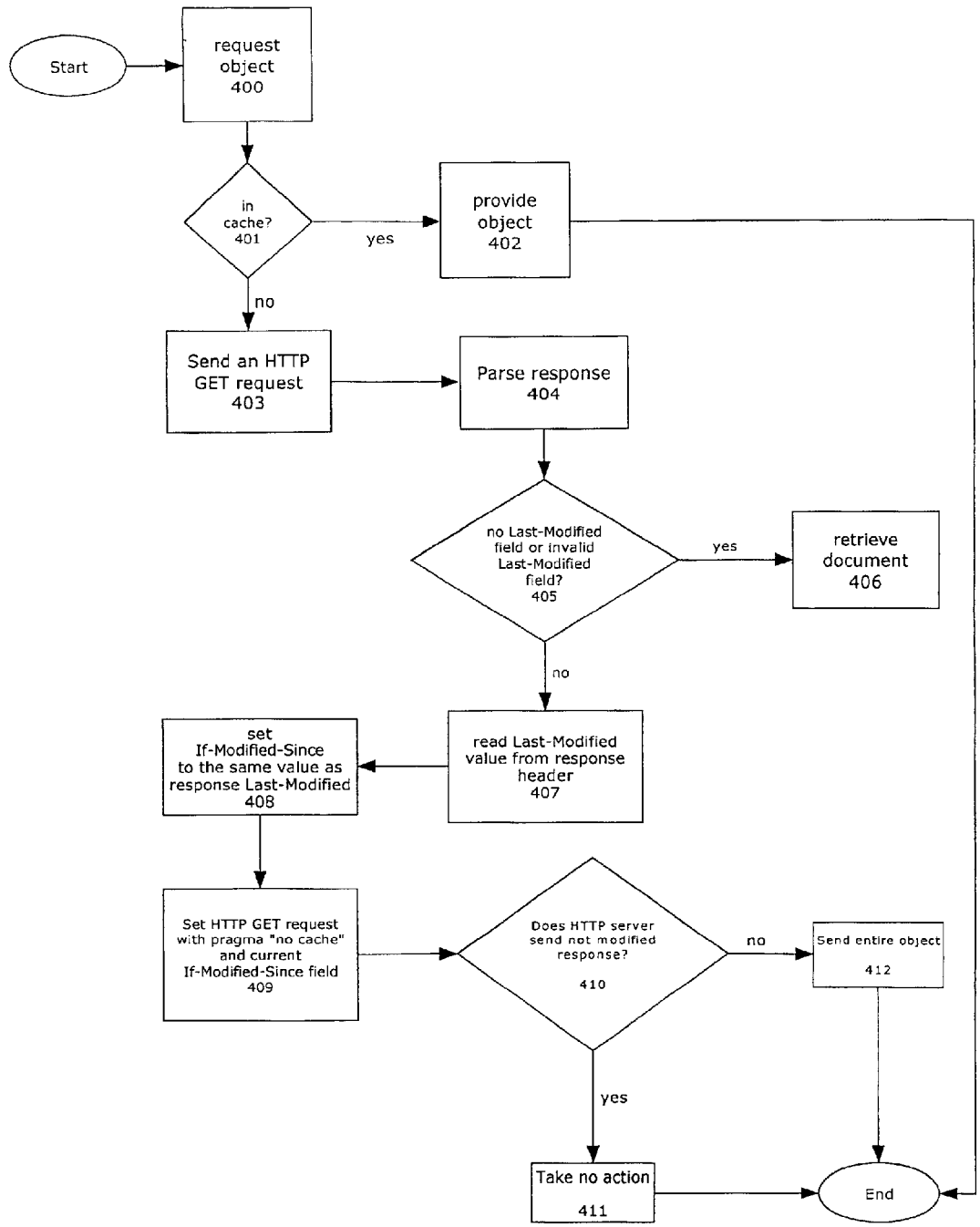
FIG. 4 is a flowchart showing an Hyper Text Transfer Protocol (HTTP) GET optimization algorithm according to an embodiment of the present invention.

FIG. 4 shows one embodiment of the HTTP GET optimization algorithm. At box 400, a request for an object occurs. At box 401, it is determined if it is in the cache. If so, the object is provided at box 402. Otherwise, at box 403, a GET request for the desired URL is sent for the desired URL. At box 404, the response header's Last-Modified field is parsed.

At box 405, it is determined if there is no Last-Modified field in the response header or if the contents of the Last-Modified field are invalid. If so, the document is retrieved at box 406. Otherwise, the Last-Modified value is read from the response header at box 407. Then, at box 408, the If-Modified-Since field is set to the value of the Last-Modified field of the previous response header. At box 409 a GET request is made with the pragma field set to no-cache. Within the same box, the If-Modified-Since field is set to the value found in the Last-Modified field of the previous response header.

At box 410, it is determined if the HTTP server sends an HTTP response code of "not modified" (code "not modified" means the document or object is not to be modified). If it does, the object is up to date, and no action is taken at box 411. Otherwise it will respond by sending the entire object at box 412.

Case Study

The amount of network traffic generated between the HTTP client intermediary and the HTTP server when using the HTTP GET optimization algorithm varies and is outlined in the following cases:

case 1: The most up-to-date copy of the object is in cache. The traffic to/from the HTTP server is one GET request+one HEAD response.

case 2: No copy of the object is in cache, and the HTTP server supports Last-Modified. The traffic to/from the server is two GET requests+one HEAD response+one BODY response.

case 3: No copy of the object is in cache, and the HTTP server doesn't support Last-Modified. The traffic to/from the server is two GET requests+two BODY responses.

case 4: A stale copy of the object is in cache. The traffic to/from the server is one GET request+one BODY response.

The HEAD response method is similar to the BODY response except that the server does not return any Entity-Body in the response. The meta-information contained in the HTTP headers in response to a HEAD-type GET request should be identical to the information sent in response to a BODY-type GET request. Thus, the HEAD response can be used for obtaining meta-information about the resource identified without transferring the Entity-Body itself. The BODY response, on the other hand, returns the Entity Body as well.

Compared with non-optimized algorithm, case 1 saves traffic for BODY responses and case 4 doesn't make any difference. Case 2 generates one more GET request and one more HEAD response on the traffic, case 3 produces one more GET request and one more BODY response. Case 1 should be the typical case for an HTTP client intermediary with sufficiently frequent preloading. Case 4 should be the next most frequent case. Case 2 does not put significantly more traffic on the network.

To improve case 3, consider that if the HTTP server does not support a Last-Modified field for a URL, the sub-URLs of the URL probably also do not support Last-Modified because it is very likely that the sub-URLs are on the same server as the URL. However, it is also possible that some of the sub-URLs are not on the same server as the URL and they do support Last-Modified. In that case, the preloader will switch to the optimized algorithm. Similarly, it is probable that if the HTTP server for an URL supports Last-Modified, the sub-URLs of the URL also support Last-Modified. In either case, the preloader's heuristic will adapt and attempt to choose the most efficient algorithm for the next URL when each URL is preloaded.

So for HTTP connections, whether or not optimization is enabled for a URL, the preloader parses the last response for last GET request to check if the server for this URL supports Last-Modified. If the HTTP server does not support a Last-Modified field, the optimization for all sub-URLs is disabled for this URL; otherwise, the optimization for all sub-URLs for this URL is enabled. Hence, this algorithm further reduces the possibility of case 3 reducing efficiency and also adjusts each URL's optimization flag to achieve the best performing algorithm. The intermediary preloader seeks to ensure retrieval of the most up-to-date copy of an object.

The proxy cache preloader is able recursively to preload the URLs directly or indirectly referenced by a web page. This makes creation and maintenance of the preload list more convenient and allows a single preloader list entry to cover an entire web site (or portion thereof). The amount of data retrieved in each recursive preload is subject to limits set in the preloader list entry.

Proxy Cache Preloader URL List

The preloader list resides at a URL specified at the time the HTTP client intermediary is installed. A preloader agent retrieves the list periodically to learn of any changes. The periodic retrieval of the preloader list is driven by a master agent residing on the intermediary. The proxy cache preloader retrieves a fresh copy of the preloader list from the administrative portal. It sends an HTTP GET request with the pragma field set to no-cache and the If-Modified-Since field set to the value that the current preloader list had when it was retrieved. As with other intermediary configuration data, the portal identifies the preloader list as not cacheable.

Figure 5:
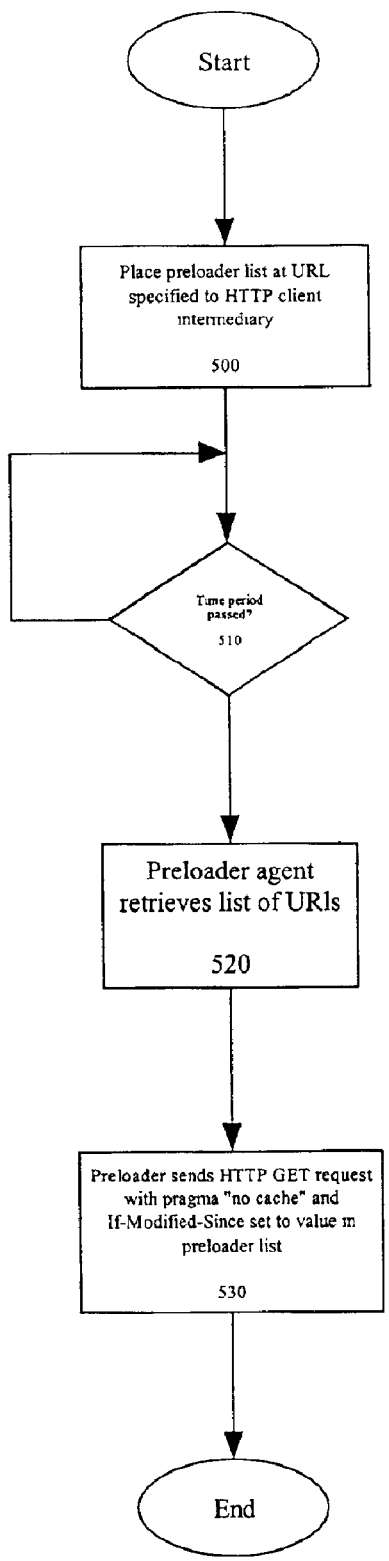
FIG. 5 is a flowchart showing the use of a proxy cache preloader Uniform Resource Locator (URL) list according to an embodiment of the present invention.

FIG. 5 is a flowchart showing the use of a proxy cache preloader URL list according to an embodiment of the present invention. At box 500, a preloader list is placed at a URL which is specified at intermediary installation time. At box 510, it is determined if a period of time has passed. If not, the system waits at box 510. When the period of time passes, a preloader agent retrieves the list of URLs at box 520 to learn of any changes. At box 530, the preloader sends an HTTP GET request with the pragma field set to no-cache and the If-Modified-Since field set to the value that the current preloader list had when it was retrieved.

Implementation Details

An intermediary monitoring mechanism is used for reporting preloader errors. A proxy cache initializing script (such as init.d) notifies the monitoring mechanism every time a cache daemon (or error) starts. The preloader notifies the monitoring mechanism every time a significant error occurs. The following preloader events are considered significant:

- the URL of the preloader list is inaccessible.
- a URL in the preloader list is inaccessible on the preloader's final retry attempt.
- the preloader successfully GETS an object. In addition to the fact that a GET succeeded, the preloader examines a specific X-Cache (the field value in the HTTP header that indicates the location of the hit) and reports the source of the object, using one of the following values:
  - proxy cache: This is the typical case in a intermediary with a sufficiently frequent preload of this URL;
  - HTTP server: This value indicates that the HTTP Expires time has been reached or the proxy cache's object replacement policy has deleted this object. The portal administrator should consider preloading this URL more frequently; and
  - unknown. The preloader couldn't interpret the X Cache field.

The intermediary HTTP client monitoring mechanism periodically queries for the rate of cached object replacement. If it is too high, the monitoring mechanism recommends that another disk be added to the system to improve proxy cache performance. In one embodiment, the preloader is written using a platform independent programming language, such as Java. In another embodiment, the preloader is written in C, C++, or another suitable high-level programming language.

CONFIGURATION EXAMPLE

In one embodiment, HTTP client intermediary configuration data is stored at an administrator's portal and the proxy cache and proxy cache preloader configuration are in extensible Markup Language (XML). The XML DTDs (Document Type Definitions), used to interpret XML, for both agents are checked into the intermediary workspace and those files become the definitive descriptions of proxy cache and proxy cache preloader configuration parameters.

The proxy cache and proxy cache preloader configuration may reside at different URLs. Each administrator URL:
- can be set at install time by a site administrator,
- can be changed at runtime by the site administrator, and
- can be changed at runtime by a portal administrator.

All other proxy cache and proxy cache preloader configurations:
- can be changed at runtime by the portal administrator, and
- survive replacement of the HTTP client intermediary.

The configuration for the proxy cache itself includes:
- a proxy cache admin URL polling frequency,
- an ICP (Internet Cache Protocol) port;
- a parent proxy cache; and
- a list of Access Control Lists (ACLs) for sets of URLs that the proxy cache will not load, thereby deriving those URLs to all users on the intermediary.

Each ACL (Access Control List) has the following subfields:
- a URL substring. A match occurs when this value is the string equivalent of the substring at the beginning of the scheme-specific part of a URL; and
- an allow/deny value. A deny value prevents the proxy cache from loading URLs with this URL substring. The existence of an allow value anywhere in the ACL list implies that access to all other URLs, except those associated with other allow values, are denied.

The proxy cache preloader configuration consists of the list of URLs to preload. Each preloader list entry contains the following fields:
- the URL to be preloaded;
- time(s) at which to begin preloading the URL. The syntax and semantics of this field must accommodate both regularly scheduled and on-demand preloads.
- a recursive preload specifier. This field's presence in a preloader list entry indicates that the "URL to be preloaded" will be treated as a starting point for a recursive preload. The recursive preload specifier consists of a "don't follow HREF (an HTML tag for hyperlink reference) except for" list.

Each entry of the "don't follow HREF except for" list includes:
- a subfield that defines a substring to be matched with the URL follow on match (match rules are the same as for the ACL URL substring); and
- subfields that specify limits for matching URLs in terms of the total number of URLs retrieved, the depth of recursive references, and the total size of objects retrieved.

Embodiment of Computer Execution Environment (Hardware)

Figure 6:
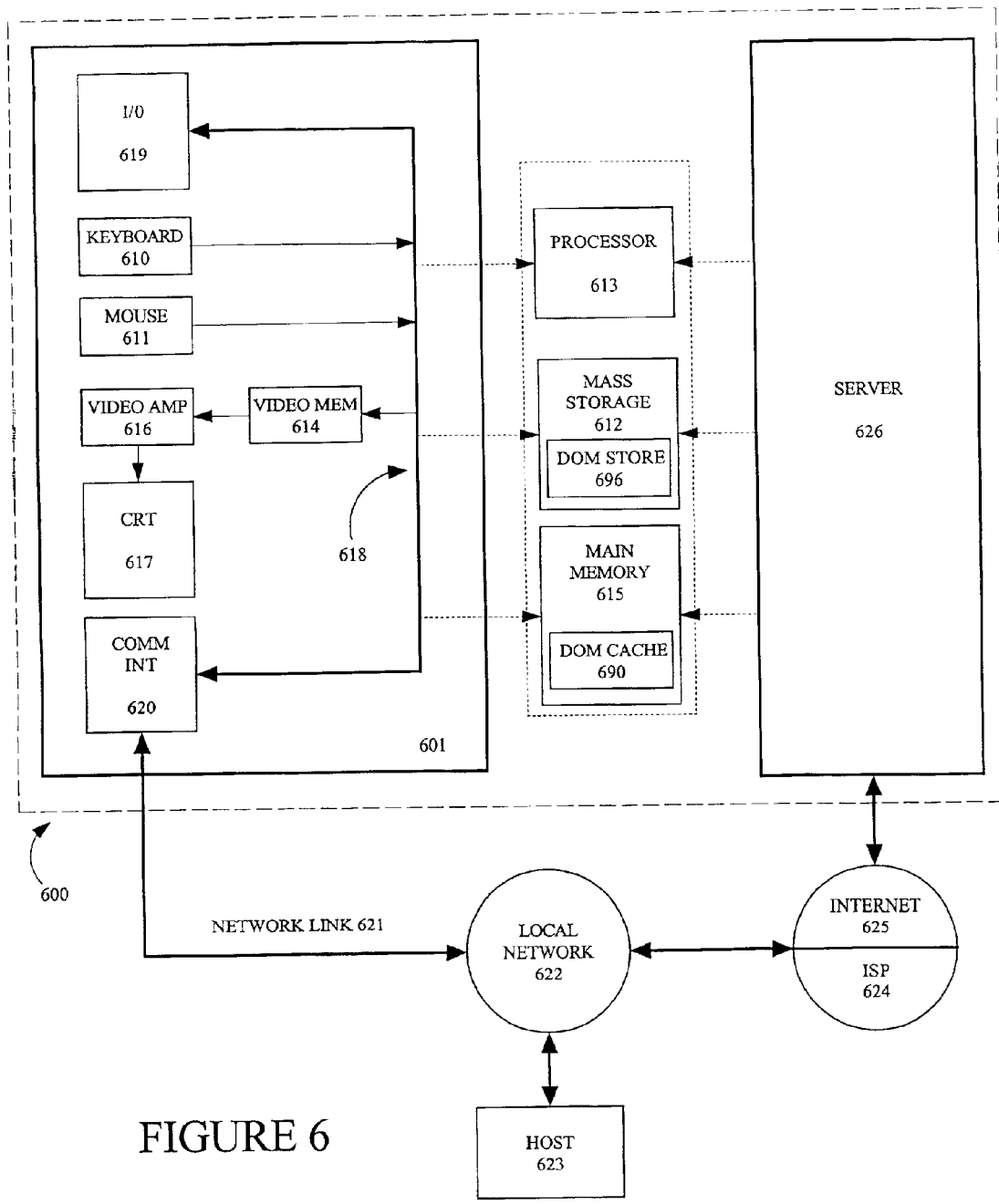
FIG. 6 shows an embodiment of a computer execution environment.

An embodiment of the invention can be implemented as computer software in the form of computer readable program code executed in a general purpose computing environment such as environment 600 illustrated in FIG. 6, in the form of bytecode class files executable within a Java™ run time environment running in such an environment; in the form of bytecodes running on a processor (or devices enabled to process bytecodes) existing in a distributed environment (e.g., one or more processors on a network); as microprogrammed bit-slice hardware; as digital signal processors; or as hard-wired control logic. A keyboard 610 and mouse 611 are coupled to a system bus 618. The keyboard and mouse are for introducing user input to the computer system and for communicating that user input to central processing unit (CPU) 613. Other suitable input devices may be used in addition to, or in place of, the mouse 611 and keyboard 610. I/O (input/output) unit 619 coupled to bi-directional system bus 618 represents such I/O elements as a printer, A/V (audio/video) I/O, etc.

Computer 601 may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to host computer 623 or to data equipment operated by ISP 624. ISP 624, in turn, provides data communication services through the world wide packet data communication network now commonly referred to as the "Internet" 625. Local network 622 and Internet 625 both use electrical, electromagnetic or optical signals which carry digital data streams. The signals through the various networks, the signals on network link 621 and through communication interface 620, which carry the digital data to and from computer 600, are exemplary forms of carrier waves transporting the information.

Processor 613 may reside wholly on client computer 601, wholly on server 626, or processor 613 may have its computational power distributed between computer 601 and server 626. Server 626 symbolically is represented in FIG. 6 as one unit, but server 626 can also be distributed between multiple "tiers." In one embodiment, server 626 comprises a middle and back tier where application logic executes in the middle tier and persistent data is obtained in the back tier. In the case where processor 613 resides wholly on server 626, the results of the computations performed by processor 613 are transmitted to computer 601 via Internet 625, Internet Service Provider (ISP) 624, local network 622 and communication interface 620. In this way, computer 601 is able to display the results of the computation to a user in the form of output.

Computer 601 includes a video memory 614, main memory 615 and mass storage 612. It is coupled to bi-directional system bus 618 along with keyboard 610, mouse 611 and processor 613. As with processor 613 in various computing environments, main memory 615 and mass storage 612 can reside wholly on server 626 or computer 601, or they may be distributed between the two. Examples of systems where processor 613, main memory 615, and mass storage 612 are distributed between computer 601 and server 626 include the thin-client computing architecture developed by Sun Microsystems, Inc., the palm pilot computing device, as well as other personal digital assistants, Internet ready cellular phones and Internet computing devices, and in platform-independent computing environments, such as those which utilize the Java technologies also developed by Sun Microsystems, Inc. XML DOM (Document Object Model) objects such as trees and identifiers for the nodes in the DOM trees may be stored in main memory 615 with a cache 690. XML DOM objects removed from the cache may be stored in an area 696 of mass storage 612.

The mass storage 612 may include both fixed and removable media, such as magnetic, optical or magnetic optical storage systems, as well as any other available mass storage technology. Bus 618 may contain, for example, thirty-two address lines for addressing video memory 614 or main memory 615. The system bus 618 may also include, for example, a 32-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor manufactured by Motorola, such as the 680X0 processor; a microprocessor manufactured by Intel, such as the 80X86, or Pentium processor; or a SPARC microprocessor from Sun Microsystems, Inc. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by processor 613 as it is received and/or stored in mass storage 612, or other non-volatile storage for later execution. In this manner, computer 600 may obtain application code in the form of a carrier wave. Alternatively, remote server computer 626 may execute applications using processor 613, as well as utilize mass storage 612 and/or video memory 615. The results of the execution at server 626 are then transmitted through Internet 625, ISP 624, local network 622 and communication interface 620. In this example, computer 601 performs only input and output functions.

Application code may be embodied in any form of computer program product. A computer program product comprises a medium configured-to-store-or-transport-computer-readable-code or that in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a proxy cache preloader is described in conjunction with one or more specific embodiments. The invention is defined by the claims and their full scope of equivalents.

What is claimed is:

1. A proxy cache preloader comprising:
   a proxy cache connected to a network;
   at least one computing device connected to said proxy cache wherein said computing device can request said proxy cache to retrieve an object from said network;
   a preload/refresh mechanism configured to determine whether an optimization is enabled for said object; and
   an optimization algorithm configured to determine whether or not to retrieve said object.

2. The preloader of claim 1 wherein said proxy cache is contained in a Hyper Text Transfer Protocol (HTTP) client intermediary.

3. The preloader of claim 2 wherein said preload/refresh mechanism is contained within said HTTP client intermediary.

4. The preloader of claim 2 further comprising a HTTP processor located physically away from said HTTP client intermediary and wherein said preload/refresh mechanism is contained within said HTTP processor.

5. The preloader of claim 1 wherein said preload/refresh mechanism is configured to determine whether said object is an HTTP Uniform Resource Locator (URL) and retrieve said object if said object is not an HTTP URL.

6. The preloader of claim 5 wherein said preload/refresh mechanism is configured to determine whether said object has an enabled optimization when said object is said HTTP URL.

7. The preloader of claim 6 wherein said preload/refresh mechanism is configured to invoke said optimization algorithm when said enabled optimization is found for said HTTP URL.

8. The preloader of claim 7 wherein said optimization algorithm is configured to parse a time and date indication field of a response header.

9. The preloader of claim 8 wherein said optimization algorithm is further configured to get said object if said time and date indication field is invalid or non-existent.

10. The preloader of claim 9 wherein said optimization algorithm is further configured to set said time and date indication field equal to a conditional field and to send an information retrieval method request when said time and date indication field is valid.

11. The preloader of claim 10 wherein said optimization algorithm is further configured to determine if a server sends a not modified response and to retrieve said object only if said server does not send said not modified response.

12. The preloader of claim 11 wherein said time and date indication field is an HTTP Last-Modified field and wherein said conditional field is an HTTP If-Modified-Since field.

13. The preloader of claim 12 wherein said informational retrieval method is an TTP GET method.

14. The preloader of claim 1 further comprising a plurality of computing devices connected to said proxy cache, wherein each of said computing devices can request said proxy cache to retrieve said object from said network.

15. The preloader of claim 14 wherein said network comprises a local network and an external network, wherein said plurality of computing devices are connected with said proxy cache via said local network and wherein said object is retrieved by said proxy cache from said external network.

16. The preloader of claim 15 wherein said plurality of computing devices comprise a first computing device and a second computing device and wherein after said first and second devices request said proxy cache for said object, said proxy cache can present a cached object, corresponding to said requested object, to said first computing device and to said second computing device via said local network.

17. A method for preloading a proxy cache comprising:

making a request to said proxy cache from at least one computing device connected to said proxy cache for retrieval of an object connected to said proxy cache;

initiating a preload/refresh mechanism to determine whether an optimization is enabled for said object; and initiating an optimization algorithm to determine whether or not to retrieve said object.

18. The method of claim 17 wherein said initiating an optimization algorithm further comprises:

parsing a Last-Modified field of a response header.

19. The method of claim 18 wherein said initiating an optimization algorithm further comprises:

getting said object if said Last-Modified field is invalid or non-existent.

20. The method of claim 19 wherein said initiating an optimization algorithm further comprises:

setting said Last-Modified field equal to an If-Modified-Since field; and sending a GET request, when said Last-Modified field is valid.

21. The method of claim 17 wherein said computing device is connected to said proxy cache via a local network and wherein said object is retrieved by said proxy cache through an external network.

22. A computer program product comprising:

a computer usable medium having computer readable program code embodied therein configured to preload a proxy cache comprising:

computer readable code configured to cause at least one computing device connected to said proxy cache to request said proxy cache to retrieve an object from a computer connected to said proxy cache;

computer readable code configured to cause a computer to initiate a preload/refresh mechanism to determine whether an optimization is enabled for said object; and computer readable code configured to cause a computer to initiate an optimization algorithm to determine whether or not to retrieve said object.

23. The computer program product of claim 22 wherein said proxy cache is contained in a Hyper Text Transfer Protocol (HTTP) client intermediary and wherein said preload/refresh mechanism is also contained within said HTTP client intermediary.

24. The computer program product of claim 22 wherein said proxy cache is contained in Hyper Text Transfer Protocol (HTTP) client intermediary, wherein said preload/refresh mechanism is contained within an HTTP processor and wherein said HTTP process is physically located away from said HTTP client intermediary.

25. The computer program product of claim 22 wherein said object from said computer is connected to said proxy cache via an external network and wherein said computing device is connected to said proxy cache via a local network.

26. The computer program product of claim 25 wherein said computer usable medium further comprises:

computer readable code configured in certain circumstances to cause said proxy cache to present a cashed object corresponding to said requested object to said computer device and another computing device connected to said proxy cache via said local network.

* * * * *